United States Patent [19]

Ohorodnik et al.

[11] 4,206,078

[45] Jun. 3, 1980

[54] PRODUCTION OF SPACE ABRASION-RESISTANT ACTIVE CARBON CARRIERS OR CATALYSTS

[75] Inventors: Alexander Ohorodnik; Klaus Gehrmann, both of Erftstadt; Hermann Vierling, Hürth, all of Fed. Rep. of Germany

[73] Assignee: Hoechst Aktinegesellschaft, Fed. Rep. of Germany

[21] Appl. No.: 964,610

[22] Filed: Nov. 29, 1978

[30] Foreign Application Priority Data

Dec. 2, 1977 [DE] Fed. Rep. of Germany ....... 2753674

[51] Int. Cl.$^2$ ...................... C01B 31/12; C01B 31/10; B01J 21/18

[52] U.S. Cl. .................................. 252/423; 252/422; 252/424; 252/446

[58] Field of Search ................ 252/424, 446, 422, 423

[56] References Cited

U.S. PATENT DOCUMENTS

| | | | |
|---|---|---|---|
| 1,251,546 | 1/1918 | Lyon | 252/424 |
| 1,396,773 | 11/1921 | Mumford | 252/424 |
| 1,448,846 | 3/1923 | Jordan | 252/424 |
| 1,610,399 | 12/1926 | Urbain | 252/423 |
| 1,867,435 | 7/1932 | Adair | 252/446 |

*Primary Examiner*—P. E. Konopka
*Attorney, Agent, or Firm*—Connolly and Hutz

[57] ABSTRACT

Abrasion-resistant active carbon carriers or catalysts are made. To this end, an abrasion-resistant carrier is impregnated with an aqueous solution of a saccharide, the impregnated carrier is dried and the saccharide is thermally decomposed in the absence of air to active carbon which tenaciously adheres to the carrier.

5 Claims, No Drawings

PRODUCTION OF SPACE ABRASION-RESISTANT ACTIVE CARBON CARRIERS OR CATALYSTS

This invention relates to a process for the manufacture of abrasion-resistant active carbon carriers or catalysts.

Active carbon is one of the auxiliaries which are widely used in the chemical industries. Its technical uses result from its high power for absorbing certain kinds of molecules. The additive combination of these molecules with active carbon shows all transition phenomena which exist between a loose physical absorption and a solid chemical absorption, the latter being critical for the use of active carbon as a catalyst or catalyst carrier. Any technically useful catalyst or catalyst carrier should however combine in itself a good absorption power with a high mechanical strength. These are requirements, however, which have not satisfactorily been met by the active carbon used heretofore. As a result, active carbon has indeed found limited uses only as catalyst or catalyst carrier in a fixed bed. In all those cases in which a fixed bed catalyst is used to effect an endothermal or exothermal reaction in contact therewith, i.e. a reaction during which heat has to be supplied to, or abstracted from, the fixed bed, it is necessary to employ expensive structural means as the fixed bed catalyst itself does not take part in the transport of heat. Preferential use has therefore been made in industry of flow beds for effecting these reactions. Under the operational conditions of a flow bed, the catalyst is in continuous movement between the differently hot media so that it is possible for it substantially to ensure the transport of heat and cooling medium to the reaction medium. To comply with this, it is necessary that the catalyst should combine in itself catalytic efficiency with high mechanical strength, defined particle size distribution and bulk density. These are requirements which active carbon made by prior art methods has been unable to meet, for the following reasons: It is not by nature resistant to abrasion; it must be crushed, screened and ground round to the desired fineness and has a low bulk density not fully satisfactory for use in a flow bed.

The present invention now provides a process for the manufacture of active carbon carriers or catalysts which combine in themselves the properties typical of active carbon with those of a reliably operational flow bed catalyst. More specifically, the catalysts made in accordance with this invention enable all reactions which are catalyzed by means of active carbon to be effected in a flow bed under commercially considerably more attractive conditions than heretofore, e.g. the preparation of phosgene from carbon monoxide and chlorine or the oxidizing dehydration of ethyl benzene to give styrene.

The present invention relates more particularly to a process for making abrasion-resistant active carbon carriers or catalysts, which comprises: impregnating an abrasion-resistant carrier with an aqueous solution of a saccharide, drying the impregnated carrier and thermally decomposing the saccharide in the absence of air to active carbon which tenaciously adheres to the carrier.

The invention also comprises the following preferred embodiments wherein:

(a) the abrasion-resistant carrier is selected from spray-dried $SiO_2$, $Al_2O_3$ or mixtures thereof;

(b) the aqueous saccharide solution is a 10 to 90 weight% aqueous solution of a mono-, oligo- or polysaccharide;

(c) the aqueous saccharide solution is used in admixture with 5 to 50 weight%, based on the saccharide, of zinc chloride or phosphoric acid as an agent splitting off water and activating the thermal decomposition of the saccharide;

(d) the saccharide is thermally decomposed to active carbon under steam or nitrogen at 400° to 800° C.;

(e) after thermal decomposition, the active carbon-carrier is water-washed so as to be freed from the agent splitting off water; and (f) after thermal decomposition, the active carbon-carrier is boiled with dilute hydrochloric acid so as to be freed from the agent splitting off water, and water-washed until neutral.

The carrier impregnated and coated by the process of the present invention can itself effectively be used as a catalyst in a plurality of reactions, e.g. for the manufacture of phosgene from carbon monoxide and chlorine, as already stated hereinabove. To be suitable for use as a catalyst in other reactions, it may be necessary for the active carbon-coated carrier to be additionally impregnated, e.g. with a palladium salt solution. These after-impregnation methods are known in the art and do not form part of this invention.

The catalyst or catalyst carriers make in accordance with this invention combine in themselves the properties of high grade active carbon (BET-surface area of 100 to 550 $m^2/g$) with those of an optimal flow bed catalyst, i.e. with improved resistance to abrasion, suitable particle size (20 to 200 microns) and apparent density (0.2 to 1.0 g/ml). Under operational conditions, the active carbon catalysts of this invention undergo abrasion substantially at the same rate as the initial carrier ($SiO_2$, $Al_2O_3$).

The skeleton materials suitable for use in making the present active carbon carriers or catalysts comprise substantially all those carriers which are normally used in flow bed techniques. They include pure silicic acid, aluminum oxide or aluminum silicates, spray-dried products which are obtained in the form of substantially spherical particles and are almost ideally suitable for use in a flow bed being preferred. The carrier should more particularly be employed in the form of particles which have a size of 20 to 200 microns, a BET-surface area of 100 to 800 $m^2/g$, a pore volume of more than 0.2 ml/g, preferably more than 0.5 ml/g, and an apparent density of 0.2 to 1.0 g/ml. To fill the free pores in the carrier with active carbon, use should preferably be made of starting materials which are selected from water-soluble polysaccharides, e.g. starch sirup, oligosaccharides, e.g. sugar sirup or monosaccharides, e.g. dextrose, which may be used in admixture with an activator, such as $ZnCl_2$, $H_3PO_4$ or another agent splitting off water.

In making the abrasion-resistant active carbon carrier or catalyst, it is good practice initially to determine the pore volume of the dried abrasion-resistant carrier. In the event of a $SiO_2$-carrier having a pore volume of 1 ml/g, it is good practice for it to be impregnated with 0.95 ml/g of an aqueous saccharide solution which may contain an agent splitting off water. As the quantity of impregnating solution used is slightly smaller than the pore volume of the carrier, it is possible for the carrier to absorb the solution quantitatively so that the individual particles are not liable to conglutinate. Next, the impregnated carrier is dried and its pore volume determined.

If some significant residual free pore volume should be determined for the carrier so impregnated, it should be impregnated once again with a suitable quantity of saccharide solution. No post-impregnation is necessary in all those cases in which the residual free pore volume of the impregnated carrier is less than 5% of the initial pore volume of the untreated carrier. A $SiO_2$-carrier having an initial pore volume of 1 ml/g and a residual pore volume of 0.04 ml/g (after impregnation with the saccharide solution and after drying) need not be subjected to post-impregnation, for example.

Depending on the pore volume of the particular carrier used, the active carbon carrier or catalyst obtained after thermal decomposition (separation of water) has a C-content of 20 to 50 weight% and a BET-surface area of 100 to 550 $m^2/g$. With the fact in mind, however, that these products contain only a 20 to 50 weight% proportion of carbon, the BET-surface areas are 2 to 5 times larger than indicated above, based on carbon.

These data and those indicated in the Examples hereinafter show that the preparation, in accordance with this invention, of active carbon-based, abrasion-resistant flow bed catalysts or catalyst carriers can be varied within wide limits.

The characteristic data of a series of carriers used for making abrasion-resistant active carbon carriers or catalysts are indicated in the following Table 1.

Table 1

| Carrier no. | 1 | 2 | 3 | 4 | 5 | 6 |
| --- | --- | --- | --- | --- | --- | --- |
| $SiO_2$-content (wt%) | 99 | 99 | 87 | 87 | 2,0 | 0,3 |
| $Al_2O_3$-content (wt%) | 0.18 | 0.08 | 13 | 13 | 98.0 | 99.7 |
| Pore volume (ml/g) | 1.08 | 2.0 | 0.7 | 0.7 | 0.5 | 0.42 |
| Apparent density (g/ml) | 0.38 | 0.2 | 0.4 | 0.5 | 0.9 | 0.9 |
| BET-surface area ($m^2/g$) | 658 | 420 | 600 | 600 | 340 | 125 |
| Average particle size (microns) | 80 | 110 | 60 | 130 | 85 | 35 |

EXAMPLES 1 to 6

1250 g of dextrose, 125 g of $ZnCl_2$ and 300 g of water were heated at 90° C. for as long as necessary to obtain a thinly liquid melt. 100 g each of the carriers 1 to 6 of Table 1 were impregnated, with agitation or by kneading, with the melt so made.

| Carrier no. | 1 | 2 | 3 | 4 | 5 | 6 |
| --- | --- | --- | --- | --- | --- | --- |
| Dextrose-melt (grams) | 100 | 190 | 66 | 66 | 46 | 39 |

The 6 carrier specimens so impregnated were dried separately and the residual free pore volume of each specimen was determined. The values were between 0.01 and 0.04 ml/g so that it was not necessary for the specimens to be post-impregnated. The monosaccharide was converted to active carbon. To this end, water was split off by gradually heating the impregnated carrier to 400° to 800° C. under nitrogen. The reaction period was 1 hour. After the thermal treatment, the active carbon catalysts were boiled out initially with dilute hydrochloric acid and then water-washed until neutral. The characteristic properties of the active carbon catalyst so made are indicated in the following Table 2.

Table 2

| Catalyst on carrier no. | 1 | 2 | 3 | 4 | 5 | 6 |
| --- | --- | --- | --- | --- | --- | --- |
| C-content (wt%) | 25 | 45 | 36.2 | 33.1 | 22.5 | 22.1 |
| Pore volume (ml/g) | 0.19 | 0.38 | 0.13 | 0.15 | 0.12 | 0.1 |
| Apparent density (g/ml) | 0.47 | 0.3 | 0.5 | 0.58 | 0.96 | 0.95 |
| BET-surface area ($m^2/g$) | 400 | 350 | 360 | 300 | 220 | 125 |
| Average particle size (microns) | 80 | 110 | 60 | 130 | 85 | 35 |

EXAMPLES 7 to 12

The carriers 1 to 6 of Table 1 were each impregnated with a solution of 1000 g of dextrose, 300 g of phosphoric acid and 200 g of water, and processed further in the manner described in Examples 1 through 6. The catalysts so made were substantially the same as those obtained in Examples 1 to 6, save that they had a BET-surface area increased by about 30%.

EXAMPLES 13 to 18

The carriers 1 to 6 of Table 1 were each impregnated with a solution of 1000 g of dextrose and 300 g of water. The dextrose was converted to active carbon at temperatures within the range 500° to 800° C. in the presence of steam. The resulting products had the same flow bed properties as the catalysts made in the manner described in Examples 1 through 12. As compared with the products made in Examples 1 to 6, they had a BET-surface area reduced by 30 to 50%.

We claim:

1. A process for making abrasion-resistant active carbon catalyst carriers or active carbon catalysts having a BET-surface area of 100 to 550 $m^2/g$, a particle size of 20 to 200 microns and an apparent density of 0.2 to 1.0 g/ml which comprises impregnating an abrasion-resistant carrier selected from spraydried $SiO_2$, $Al_2O_3$ and mixtures thereof having a BET-surface area of 100 to 800 $m^2/g$, a particle size of 20 of 200 microns, an apparent density of 0.2 to 1.0 g/ml and a pore volume of more than 0.2 ml/g with an aqueous solution of a saccharide, drying the impregnated carrier and thermally decomposing the saccharide under steam or nitrogen in the absence of air at 400° to 800° C. to active carbon which tenaciously adheres to the carrier.

2. A process as claimed in claim 1, wherein a 10 to 90 weight% aqueous solution of a saccharide selected from the group consisting of monosaccharides, oligosaccharides and polysaccharides is used.

3. A process as claimed in claim 1, wherein the aqueous saccharide solution is used in admixture with 5 to 50 weight%, based on the saccharide, of zinc chloride or phosphoric acid as an agent splitting off water and activating the thermal decomposition of the saccharide.

4. A process as claimed in claim 3, wherein, after thermal decomposition, the active carbon carrier is water-washed so as to be freed from the agent splitting off water.

5. A process as claimed in claim 3, wherein, after thermal decomposition, the active carbon carrier is boiled with dilute hydrocholric acid so as to be freed from the agent splitting off water, and water-washed until neutral.

* * * * *

UNITED STATES PATENT AND TRADEMARK OFFICE
CERTIFICATE OF CORRECTION

PATENT NO. : 4,206,078
DATED : June 3, 1980
INVENTOR(S) : Alexander Ohorodnik et al It is certified that error appears in the above-identified patent and that said Letters Patent are hereby corrected as shown below:

Front page, left hand column, item [54], line 1 of the Title delete "SPACE".

Front page, left hand column, item [73] change "Aktinegesellschaft" to -- Aktiengesellschaft --.

Column 1, line 3 delete "SPACE".

Column 4, line 65 change "hydrocholric" to -- hydrochloric --.

Signed and Sealed this

Ninth Day of December 1980

[SEAL]

Attest:

SIDNEY A. DIAMOND

Attesting Officer

Commissioner of Patents and Trademarks